United States Patent
Menke et al.

[11] Patent Number: 6,065,817
[45] Date of Patent: May 23, 2000

[54] METHOD AND SYSTEM FOR CONTROLLING A FLUID ACTUATED RETARDER

[75] Inventors: Gregory A. Menke, East Peoria; Danial P. Simon; Kenneth P. Liesener, both of Peoria, all of Ill.

[73] Assignee: Caterpillar Inc., Peoria, Ill.

[21] Appl. No.: 09/096,034

[22] Filed: Jun. 11, 1998

[51] Int. Cl.[7] .................................................. B60T 8/36
[52] U.S. Cl. ........................ 303/119.1; 303/3; 188/294
[58] Field of Search .................... 188/290, 294, 188/291, 296; 303/117.1, 119.1, 3; 477/183, 186, 187; 192/216; 701/67, 68

[56] References Cited

U.S. PATENT DOCUMENTS

| | | | |
|---|---|---|---|
| 3,882,973 | 5/1975 | Hakes | 188/290 |
| 4,768,401 | 9/1988 | Fuehrer et al. | 74/846 |
| 4,836,341 | 6/1989 | Hall, III | 188/290 |
| 4,881,625 | 11/1989 | Redelman | 188/290 |
| 4,981,198 | 1/1991 | Klemen et al. | 188/294 |
| 5,000,300 | 3/1991 | Klemen et al. | 188/294 |
| 5,101,941 | 4/1992 | Long et al. | 188/290 |
| 5,333,707 | 8/1994 | Kaneda | 188/290 |
| 5,351,795 | 10/1994 | Dadel et al. | 477/96 |
| 5,357,444 | 10/1994 | Ishiguro et al. | 364/426.01 |
| 5,358,081 | 10/1994 | Kaneda et al. | 188/291 |
| 5,400,251 | 3/1995 | Ishiguro et al. | 364/426.02 |
| 5,456,340 | 10/1995 | Dadel et al. | 188/294 |
| 5,678,901 | 10/1997 | Lee et al. | 303/117.1 |
| 5,682,315 | 10/1997 | Coutant et al. | 364/424.08 |

*Primary Examiner*—Robert J. Oberleitner
*Assistant Examiner*—Mariano Sy
*Attorney, Agent, or Firm*—Kevin M. Kercher; Jeffery L. Myers

[57] ABSTRACT

In one aspect of this invention, a system and process for controlling a fluid actuated retarder is disclosed. This includes an input mechanism and an electronic controller for receiving a signal from the input mechanism, including a value for a desired retarder control level. Also, there is a proportional solenoid valve that is actuated by the electronic controller. The proportional solenoid control valve is operatively connected to a proportional retarder spool valve and the proportional retarder spool valve is operatively connected to a fluid actuated retarder.

20 Claims, 3 Drawing Sheets

METHOD AND SYSTEM FOR CONTROLLING A FLUID ACTUATED RETARDER

TECHNICAL FIELD

This invention relates generally to a fluid actuated retarder and, more particularly, to a system and method of controlling the response of a fluid actuated retarder.

BACKGROUND ART

In general, the output shaft of an engine is typically connected to an input shaft of a torque converter and an output shaft of a torque converter is typically connected to an input shaft of a transmission. A retarder is typically located between an input shaft of a transmission and an output shaft of a torque converter so as to provide a rotatable connection. An electronic control system is typically utilized to smoothly engage and disengage the fluid actuated retarder. The retarder functions to provide braking torque that typically results in a decrease in machine speed.

One known arrangement utilizes an on/off solenoid to engage and disengage the retarder. This on/off solenoid provides a very abrupt change in the level of retarding. This results in the retarder not being responsive to excessive machine deceleration rates. In addition, the retarder is not responsive to heat buildup in either the retarder or the transmission in order to modify the retarding level. Furthermore, this on/off application of a fixed retarding level has been known to aggravate transmission downshifting by adding excessive braking torque during the shifting operation. This prevents smooth transmission operation during downshifting. In addition, this arrangement is slow to build retarding torque.

The present invention is directed to overcoming one or more of the problems set forth above.

DECLOSURE OF THE INVENTION

In one aspect of this invention, a system for controlling a fluid actuated retarder is disclosed. The system includes an input mechanism that generates a signal, including a value for a desired level of retarding and an electronic controller for receiving a signal from the input mechanism, including the value for a desired level of retarding. This system also includes a proportional solenoid control valve that is actuated by the electronic controller. The proportional solenoid control valve is operatively connected to a proportional retarder spool valve and the proportional retarder spool valve is operatively connected to a fluid actuated retarder.

In another aspect of the present invention, a process for controlling a fluid actuated retarder is disclosed. The fluid actuated retarder is operatively connected to a proportional solenoid control valve that is activated by an electronic controller that also receives a signal from an input mechanism, including a value for a desired retarding level, the method includes the step of applying current to the proportional solenoid control valve wherein the proportional solenoid control valve is operatively connected to a proportional retarder spool valve that is operatively connected to a fluid actuated retarder.

BRIEF DESCRIPTION OF THE DRAWINGS

For a better understanding of the present invention, reference may be made to the accompanying drawings in which.

BEST MODE FOR CARRYING OUT THE INVENTION

Figure 1:
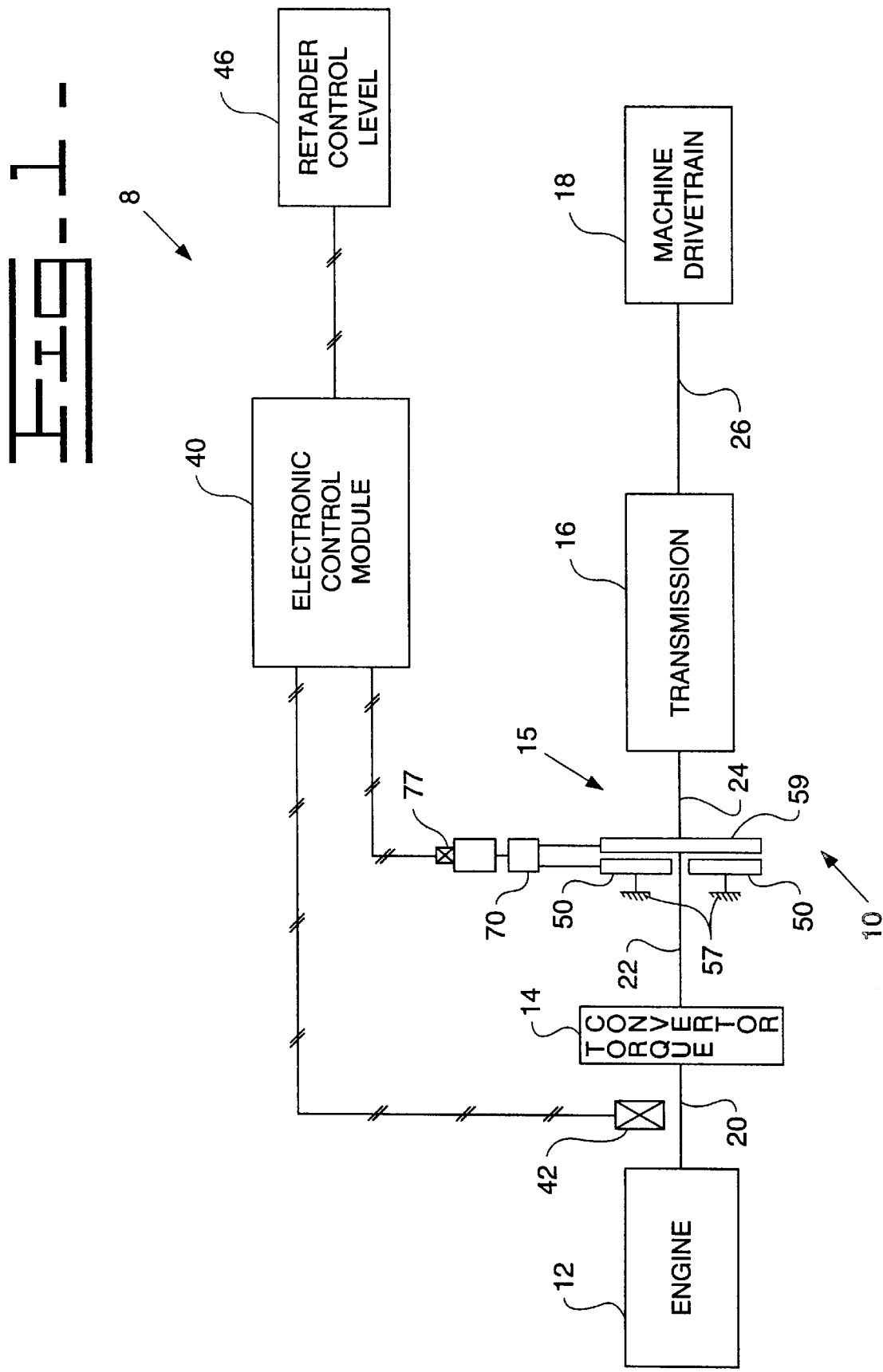
FIG. 1 is a block diagram of an electronic control system of a machine including an engine, drivetrain, transmission, torque converter and a fluid actuated retarder.

Referring now to the drawings, and initially to FIG. 1, an electronic control system 8 of a power train 10 is depicted that includes an internal combustion engine 12, a fluidic torque converter 14, a fluid actuated retarder 15, a multi-speed power transmission 16, and a machine drivetrain 18. The engine 12 is connected to the torque converter 14 by a first shaft 20 and the torque converter 14 is connected to the fluid actuated retarder 15 by a second shaft 22. The fluid actuated retarder 15 is connected to the transmission 16 by a third shaft 24 and the transmission 16 is connected to the machine drivetrain 18 by a fourth shaft 26.

The control portion of the drivetrain will now be discussed. Initially, an operator moves the retarder control level switch 46 to a position that will provide an input signal that comports with a desired level of retarding. An electronic control module 40 receives the input signal from the retarder control level switch 46. The retarder control level switch 46 can also be a sensor. The electronic control module 40 then controls the operation of a proportional solenoid control valve 77. The electronic control system also receives various other inputs representing machine system parameters. These other inputs include an engine speed signal from an engine speed sensor 42. The flow of fluid into the fluid actuated retarder 15 is controlled by the proportional solenoid control valve 77.

The fluid actuated retarder 15 is a centrifugal pump where the outlet pressure is greater than the inlet pressure. The greater the amount of pressurization of the fluid flowing into the retarder 15, the greater the amount of retarding torque applied to the input of the transmission 16. The fluid actuated retarder 15 includes a rotator 59 coupled to the third shaft 24 and a stator 50 that is grounded to a housing 57 for the fluid actuated retarder 15.

The engine speed sensor 42 is preferably a conventional electrical transducer, such as magnetic speed pickup, however any of a wide variety of other speed-type sensing elements including torque sensors and accelerometers will suffice.

The electronic control module 40 delivers a retarder level command signal that is proportional to the desired current needed to operated the proportional solenoid control valve 77. In the preferred embodiment, the current driver utilizes a pulse width modulated voltage to produce the desired current. The proportional solenoid control valve 77 is configured to maintain communication of fluid, preferably oil, to a proportional retarder spool valve 70, that is sufficient to maintain a retarder control level that is proportional to the solenoid current.

Accordingly, the electronic control module 40 controls the level of retarding by means of a proportional command signal provided to the proportional solenoid control valve 77 that controls the amount of fluid entering into the proportional retarder spool valve 70 that controls the fluid actuated retarder 15.

Figure 2:
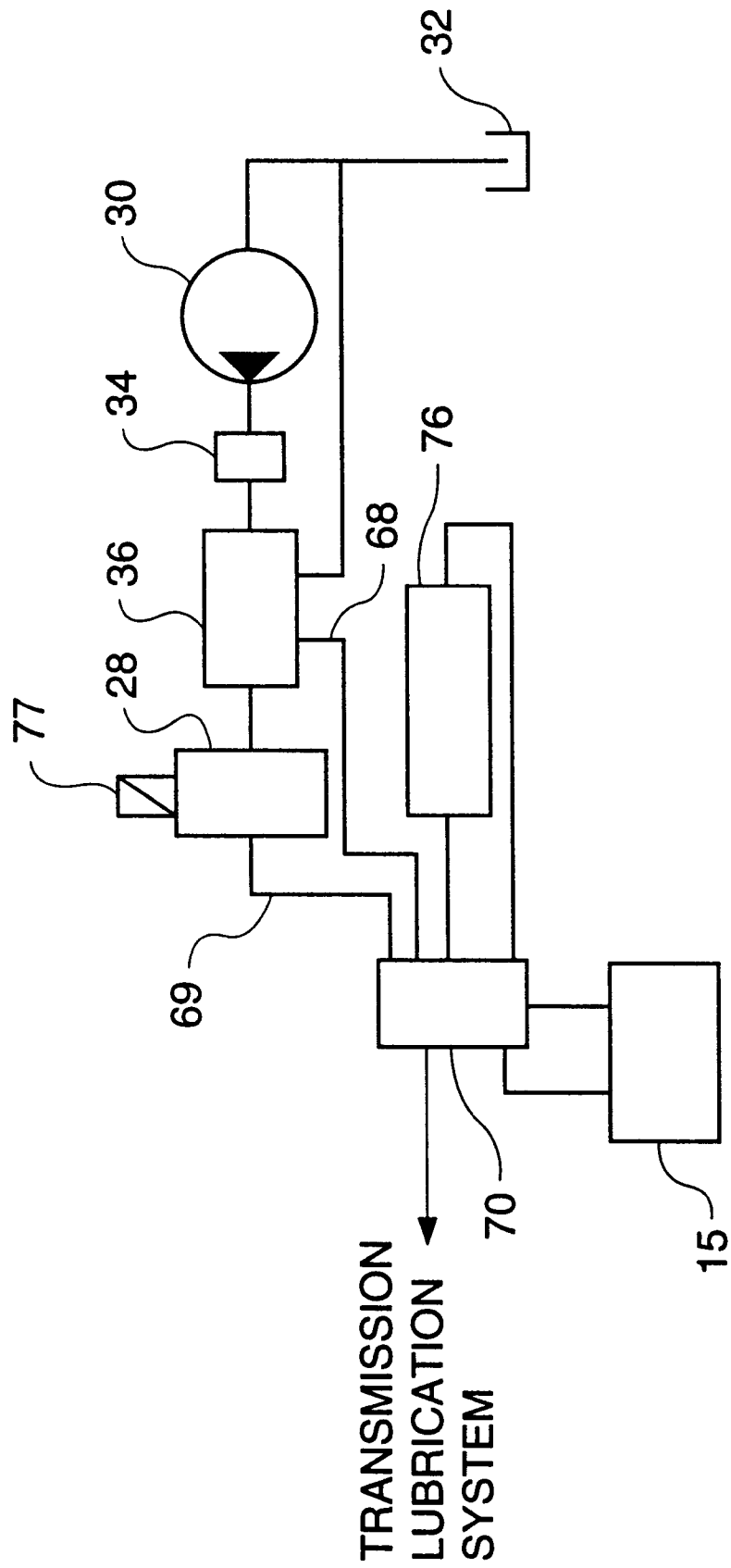
FIG. 2 is a block diagram illustrating an embodiment of a hydraulic system for a fluid actuated retarder.

Referring now to FIG. 2, a block diagram of a hydraulic system for the retarder 15 is shown. The hydraulic circuit of the transmission includes a positive displacement pump 30 that supplies pressurized hydraulic fluid from the sump or reservoir 32, through a filtering unit 34, to the fluid actuated retarder 15. Optionally, a pressure relief valve 36 may be added to regulate the valve supply pressure. The bulk of the fluid flows directly through conduit 68 from the pressure relief valve 36, while the control valve 28 provides a fluid pressure value through conduit 69 that is proportionate to the signal applied to the proportional solenoid control valve 77. This fluid pressure value controls the amount of fluid that proportionally flows through conduit 68 to the retarder spool valve 70 directly from the pressure relief valve 36. Excess hydraulic fluid returns to the sump or reservoir 32. There is a cooler 76 for controlling the temperature of the fluid flowing into the retarder spool valve 70. Fluid from the proportional retarder spool valve 70 flows into the retarder 15.

Figure 3:
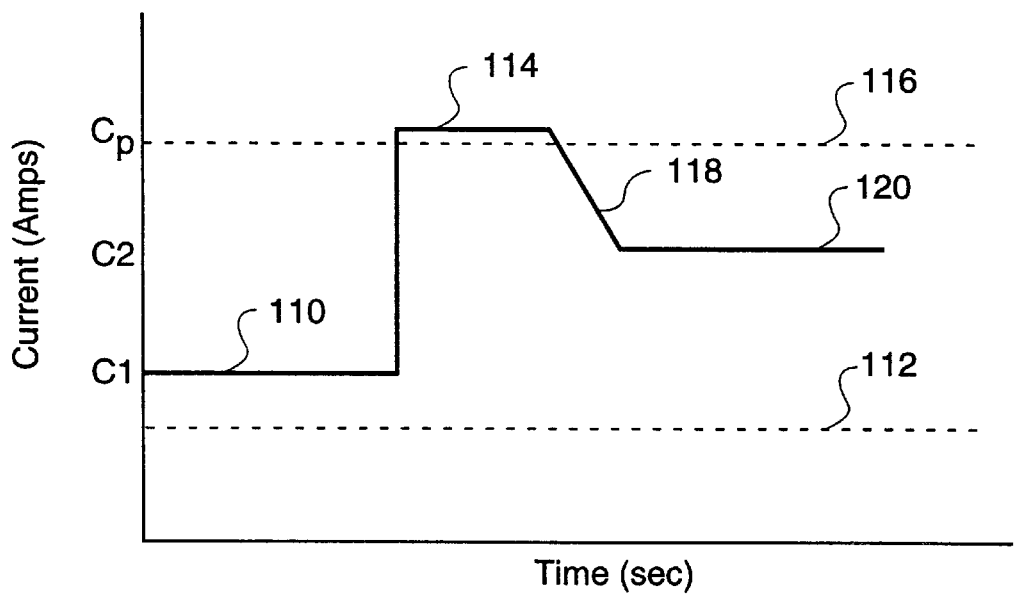
FIG. 3 shows a timing chart for increasing the level of retarding by illustrating the current level from a first current level, through the pulse time and ramp time and then into a second current level.

The command pulse utilized to increase the level of retarding is depicted in FIG. 3. Immediately, at the initiation of a desired retarding level change, there is a requested, first current level depicted by numeral 110 that is slightly higher than the minimum level required to operate the retarder 15 that is depicted by numeral 112. This minimal level 112 is a threshold current level below which there is minimal retarder 15 effectiveness as well as a chance of retarder spool valve 70 instability.

As shown, the command pulse 114 is at a relatively high level for a predetermined period of time that can be just slightly above the maximum continuous retarding current 116 for a limited period of time, as shown in FIG. 3. This maximum continuous retarding current 116 is the current level that can cause long term damage to the proportional solenoid control valve 77 as well as the rotating seals of the retarder 15. However, the command pulse 114 can be considerably less than the maximum continuous retarding current 116. This command pulse 114 to the proportional solenoid valve 77 quickly opens the proportional retarder spool valve 70 and fills the fluid actuated retarder 15. The fluid actuated command pulse 114 is then decreased to a requested, second current level 120 by means of a ramp function 118 with a negative slope during a ramp time. This requested, second current level 120 will increase the level of retarding applied to the machine since this requested, second level of retarding is higher than the requested, first level of retarding. The command pulse 114 only needs to exceed the requested, second current level 120.

Once again, the object is to provide a rapid increase in the amount of retarding applied by the retarder 15, as shown in FIG. 1. This will result in the retarder being rapidly responsive to excessive machine acceleration rates In addition, the retarder can respond to heat buildup in either the retarder or transmission in order to modify the retarding level.

The pulse current level 114 can be determined from the difference between the requested, first retarding level 110 and the requested, second retarding level 120 times a multiplication factor.

This product is then added to the final requested retarding level 120. This relationship holds true when the command pulse 114 is greater than the requested, second retarder level 120 and the requested, second retarder level 120 is greater than the requested, first retarder level 110. The current levels and multiplication factor depend on the type of machine and the manufacturer of that specific machine.

Figure 4:
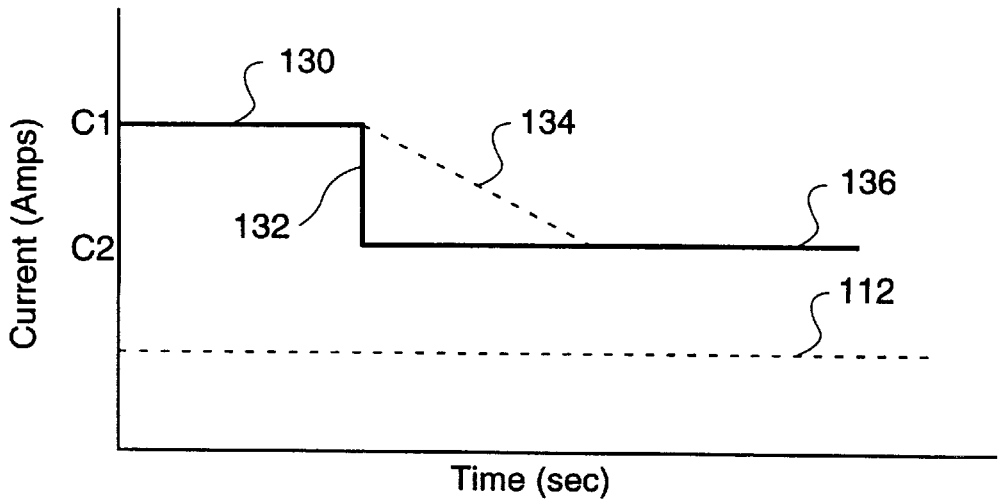
FIG. 4 shows a timing chart for decreasing the level of retarding by illustrating the current level from a first current level, though a ramp time and then into a second current level.

The current curve utilized to decrease the level of retarding is depicted in FIG. 4. There is a requested, first current level depicted by numeral 130 that is significantly higher than the minimum level, as previously described above, required to operate the fluid actuated retarder 15 that is depicted by numeral 112. The fluid actuated command pulse 130 is then decreased to a lower, requested, second current level 136 by means of either a ramp function 134 with a negative slope during a ramp time or a step function 132. This requested, second current level 136 will decrease the level of retarding applied to the machine. There are a number of advantages derived from the smooth ramp function 134 as opposed to a harsh step function 132. The smooth ramp function 134 will provide a smooth transition between retarding levels so that the level of retarding applied by the retarder 15, as shown in FIG. 1, is slowly and gradually decreased so that smooth machine operation occurs during this process.

Once again, the requested first and second current levels depend on the type of machine and the manufacturer of that specific machine.

The retarder can also engage when the speed of the engine 12 exceeds a predetermined value. This will provide overspeed protection by providing full retarding torque. An illustrative, but nonlimiting, example would include a predetermined factor of 2,500 revolutions per minute for off-highway trucks.

The amount of retardation can be either at fixed levels or infinitely variable. The levels of retardation can be detected between the proportional solenoid control valve 77 and the proportional retarder spool 70 through conduit 69. An illustrative, but nonlimiting level of discrete levels of retarding for an off-highway truck would include 215 kPa. for a low level of retarding at 50% of the total retarding torque, 350 kPa. for a middle level of retarding at 75% of the total retarding torque, and 500 kPa. for a high level of retarding at 100% of the total retarding torque.

Industrial Applicability

The present invention is advantageously applicable in controlling the application of a retarder with a proportional control valve to provide a smooth transition between discrete levels of retarding or infinitely variable retarding, typically, but not necessarily limited to, construction machines such as motor graders, off-highway trucks, wheel loaders, bulldozers, and the like. The following description is only for the purposes of illustration and is not intended to limit the present invention as such. It will be recognizable, by those skilled in the art, that the present invention is suitable for a plurality of other applications.

The present invention provides a smooth increase or decrease in the level of retarding through the activation of the proportional solenoid valve 77 by the electronic controller 40. The level of retarding can be either in discrete levels or infinitely variable. The retarding current level is increased by going from a requested, first current level to a pulse current level and then ramped down to a requested, second current level that is higher than the requested, first current level. The retarding current level is decreased by going from a requested, first current level and then is ramped down to a requested, second current level that is lower than the requested, first current level. Although the ramp function is preferred, the step function will suffice.

In view of the foregoing, it is readily apparent that the subject retarder control provides a vastly improved mechanism for applying a retarding level to a machine.

Other aspects, objects and advantages of the present invention can be obtained from a study of the drawings, the disclosure and the appended claims.

What is claimed is:

1. A system for controlling a fluid actuated retarder comprising:

an input mechanism that generates a signal, including a value for a desired amount of retarding;

an electronic controller for receiving a signal from said input mechanism, including said value for a desired level of retarding;

a proportional solenoid control valve that is actuated by said electronic controller;

a proportional retarder spool valve that is operatively connected to said proportional solenoid control valve; and said fluid actuated retarder that is operatively connected to said proportional retarder spool valve.

2. The system of claim 1, wherein said input mechanism provides at least one discrete retarding level.

3. The system of claim 1, wherein said input mechanism provides infinitely variable retarding levels.

4. The system of claim 1, wherein said electronic controller utilizes a step function when decreasing from a first current level applied to said proportional solenoid control valve to a second current level applied to said proportional solenoid control valve.

5. The system of claim 1, wherein said electronic controller utilizes a substantially sloped function when decreasing from a first current level applied to said proportional solenoid control valve to a second current level applied to said proportional solenoid control valve.

6. A system for controlling a fluid actuated retarder comprising:

an input mechanism that generates a signal, including a value for a desired amount of retarding;

an electronic controller for receiving a signal from said input mechanism, including said value for a desired level of retarding;

a proportional solenoid control valve that is actuated by said electronic controller;

a proportional retarder spool valve that is operatively connected to said proportional solenoid control valve;

said fluid actuated retarder that is operatively connected to said proportional retarder spool valve, wherein said electronic controller applies a first current level to said proportional solenoid control valve and then applies a current level pulse to said proportional solenoid control valve and then utilizes a substantially sloped function when decreasing from said current level pulse to a second current level wherein said second current level has a higher value than said first current level and said current level pulse has a higher value than said second current level.

7. A system for controlling a fluid actuated retarder comprising:

an input mechanism that generates a signal, including a value for a desired amount of retarding;

an electronic controller for receiving a signal from said input mechanism, including said value for a desired level of retarding;

a proportional solenoid control valve that is actuated by said electronic controller;

a proportional retarder spool valve that is operatively connected to said proportional solenoid control valve;

said fluid actuated retarder that is operatively connected to said proportional retarder spool valve, wherein said value of said current level pulse is determined by multiplying a difference between said first current level and said second current level by a predetermined value and then adding said second current level.

8. A system for controlling a fluid actuated retarder comprising:

an input mechanism that generates a signal, including a value for a desired level of retarding and a value for speed of an engine drive;

an electronic controller for receiving a signal from said input mechanism, including said value for a desired level of retarding and said value for speed of an engine drive;

a proportional solenoid control valve that is actuated by said electronic controller;

a proportional retarder spool valve that is operatively connected to said proportional solenoid control valve; and said fluid actuated retarder that is operatively connected to said proportional retarder spool valve.

9. The system of claim 8, wherein said input mechanism provides at least one discrete retarding level.

10. The system of claim 8, wherein said input mechanism provides infinitely variable retarding levels.

11. The system of claim 8, wherein said electronic controller utilizes a substantially sloped function when decreasing from a first current level applied to said proportional solenoid control valve to a second current level applied to said proportional solenoid control valve.

12. A system for controlling a fluid actuated retarder comprising:

an input mechanism that generates a signal, including a value for a desired level of retarding and a value for speed of an engine drive;

an electronic controller for receiving a signal from said input mechanism, including said value for a desired level of retarding and said value for speed of an engine drive;

a proportional solenoid control valve that is actuated by said electronic controller;

a proportional retarder spool valve that is operatively connected to said proportional solenoid control valve;

said fluid actuated retarder that is operatively connected to said proportional retarder spool valve, wherein said electronic controller applies a first current level to said proportional solenoid control valve and then applies a current level pulse to said proportional solenoid control valve and then utilizes a substantially sloped function when decreasing from said current level pulse to a second current level wherein said second current level has a higher value than said first current level and said current level pulse has a higher value than said second current level.

13. A method for actuating a fluid actuated retarder, which is operatively connected to a proportional solenoid control valve that is activated by an electronic controller that also receives a signal from an input mechanism, including a value for a desired level of retarding, the method comprising the step of:

applying current to said proportional solenoid control valve wherein said proportional solenoid control valve is operatively connected to a proportional retarder spool valve and said proportional retarder spool valve is operatively connected to said fluid actuated retarder.

14. The method of claim 13, wherein said signal from said input mechanism includes a value for speed of an engine drive.

15. The method of claim 13, wherein said signal from said input mechanism includes at least one discrete retarding level.

16. The method of claim 13, wherein said signal from said input mechanism provides infinitely variable retarding levels.

17. The method of claim 13, wherein said step of applying current to said proportional solenoid control valve includes the step of utilizing a step function when decreasing from a first current level applied to said proportional solenoid control valve to a second current level applied to said proportional solenoid control valve.

18. The method of claim 13, wherein said step of applying current to said proportional solenoid control valve includes the step of utilizing a substantially sloped function when decreasing from a first current level applied to said proportional solenoid control valve to a second current level applied to said proportional solenoid control valve.

19. A method for actuating a fluid actuated retarder, which is operatively connected to a proportional solenoid control valve that is activated by an electronic controller that also receives a signal from an input mechanism, including a value for a desired level of retarding, the method comprising the step of:

applying current to said proportional solenoid control valve wherein said proportional solenoid control valve is operatively connected to a proportional retarder spool valve and said proportional retarder spool valve is operatively connected to said fluid actuated retarder, wherein said step of applying current to said proportional solenoid control valve includes the step of applying a first current level to said proportional solenoid control valve and then applying a current level pulse to said proportional solenoid control valve and then utilizing a substantially sloped function when decreasing from said current level pulse to a second current level wherein said second current level has a higher value than said first current level and said current level pulse has a higher value than said second current level.

20. A method for actuating a fluid actuated retarder, which is operatively connected to a proportional solenoid control valve thar is activated by an electronic controller that also receives a signal from an input mechanism, including a value for a desired level of retarding, the method comprising the step of:

applying current to said proportional solenoid control valve wherein said proportional solenoid control valve is operatively connected to a proportional retarder spool valve and said proportional retarder spool valve is operatively connected to said fluid actuated retarder, wherein said step of applying current to said proportional solenoid control valve includes the step of applying a first current level to said proportional solenoid control valve and then applying a current level pulse to said proportional solenoid control valve and then utilizing a substantially sloped function when decreasing from said current level pulse to a second current level wherein said second current level has a higher value than said first current level and said current level pulse has a higher value than said second current level, wherein said value of said current level pulse is determined by multiplying a difference between said first current level and said second current level by a predetermined value and then adding said second current level.

* * * * *